United States Patent
Shuler et al.

(10) Patent No.: US 6,923,494 B2
(45) Date of Patent: Aug. 2, 2005

(54) PEDESTRIAN ENERGY ABSORBER FOR AUTOMOTIVE VEHICLES

(75) Inventors: Stephen Shuler, Royal Oak, MI (US); Adams Trappe, Chesterfield, MI (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 10/617,219

(22) Filed: Jul. 10, 2003

(65) Prior Publication Data
US 2004/0036302 A1 Feb. 26, 2004

Related U.S. Application Data
(60) Provisional application No. 60/405,793, filed on Aug. 23, 2002.

(51) Int. Cl.[7] .................................................. B60J 7/00
(52) U.S. Cl. ................. 296/187.05; 293/120
(58) Field of Search ........................ 296/187.05, 187.04, 296/187.09; 293/120, 133, 134, 132, 136, 155, 102

(56) References Cited

U.S. PATENT DOCUMENTS

| | | | |
|---|---|---|---|
| 5,425,561 A | * | 6/1995 | Morgan ...................... 293/120 |
| 5,441,319 A | * | 8/1995 | Oyama et al. ............... 293/155 |
| 5,601,679 A | | 2/1997 | Mulcahy et al. |
| 6,082,792 A | * | 7/2000 | Evans et al. ........... 296/187.03 |
| 6,270,131 B1 | * | 8/2001 | Martinez et al. ............ 293/132 |
| 6,315,339 B1 | * | 11/2001 | Devilliers et al. .......... 293/120 |
| 6,371,540 B1 | * | 4/2002 | Campanella et al. ........ 293/120 |
| 6,406,081 B1 | * | 6/2002 | Mahfet et al. .............. 293/120 |
| 6,609,740 B2 | * | 8/2003 | Evans ........................ 293/120 |
| 6,663,150 B1 | * | 12/2003 | Evans ........................ 293/120 |
| 6,669,251 B2 | * | 12/2003 | Trappe ........................ 293/120 |
| 6,685,243 B1 | * | 2/2004 | Evans ........................ 293/121 |
| 6,695,368 B1 | * | 2/2004 | Weykamp et al. .......... 293/150 |

OTHER PUBLICATIONS

DuBois and Pribble, "Plastics Mold Engineering Handbook", Fifth Edition, 1995, pp. 468–498.

* cited by examiner

Primary Examiner—Kiran B. Patel

(57) ABSTRACT

An energy absorber that incorporates pedestrian protection and vehicle protection into a front bumper system on automotive vehicles comprises a unitary molded glass mat of thermoplastic material having a plurality of outwardly extending crushable lobes. The energy absorber is combined with a fascia and a reinforcing beam with the energy absorber interdisposed to form a bumper system for automotive vehicles.

22 Claims, 3 Drawing Sheets

PEDESTRIAN ENERGY ABSORBER FOR AUTOMOTIVE VEHICLES

CROSS REFERENCE TO RELATED APPLICATIONS

This application claims priority to U.S. Provisional Application Ser. No. 60/405,793 filed on Aug. 23, 2002, which is incorporated herein by reference in its entirety.

FIELD OF INVENTION

The invention relates to an energy absorber that incorporates pedestrian protection into a front bumper system on an automotive vehicle.

BACKGROUND OF THE INVENTION

Future legislation in Japan and European countries may require an energy absorbent design for a vehicle bumper system to help protection a pedestrian's legs from an impact.

Current bumper impact systems employ several separate components which are assembled. Generally, these components include a soft energy absorber backed by stiff reinforcing beam to achieve US FMVSS and European ECE42 impact. The component parts of the energy absorber may be a thermoplastic resin or a polypropylene foam adjacent a stiff supporting reinforcing beam of steel or aluminum. The bumper assembly typically includes a reinforcing beam, which is configured to attach to vehicle rails, an energy absorber, and an aesthetic fascia attachable to the energy absorber. The fascia typically substantially envelops both the reinforcing beam and energy absorber. Traditional vehicle bumper and bumper energy absorber systems have been designed to protect vehicle structures and possibly occupants of the vehicle during low speed, about 5 miles per hour (mph), in a vehicle-to-vehicle or vehicle-to-solid structure impact. The new legislation requires a level of pedestrian protection during impact with the front end of an automotive vehicle. The impact energy levels during such an occurrence are much lower than the traditional 5 mph vehicle bumper impacts. Systems designed for 5 mph vehicle bumper impact are maybe too stiff to provide a sufficient level of pedestrian injury mitigation.

SUMMARY OF INVENTION

According to an embodiment, an elongated impact energy absorber comprises a molded mat of fiber reinforced material having a forwardly projection portion adapted to crush upon impact to absorb forces generated during impact. In an embodiment, the energy absorber extends longitudinally across the front of a vehicle. In an embodiment, the forwardly projecting portion includes a portion for initiating at least the partial collapse of said forwardly projecting portion for absorbing forces created by an impact. The energy absorber is formed from a reinforced resin material. According to one embodiment, the energy absorbing system has a construction which promotes enhanced energy absorption efficiency. The system is adaptable and may be desirable for applications where low levels of energy need to be absorbed, such as in the area of pedestrian protection upon impact with the front end of an automotive vehicle.

According to an embodiment, a bumper system is adapted to minimize or mitigates pedestrian injury at low levels of speed and particularly lower and upper leg injuries. The system comprises a reinforcing bumper beam, energy absorber of a molded reinforced resin material and a fascia that envelops the energy absorber and beam. According to the embodiment, the energy absorber is comprised of a compression molded fibrous composite wherein a thermoplastic resin is utilized.

DETAILED DESCRIPTION OF THE INVENTION

Figure 1:
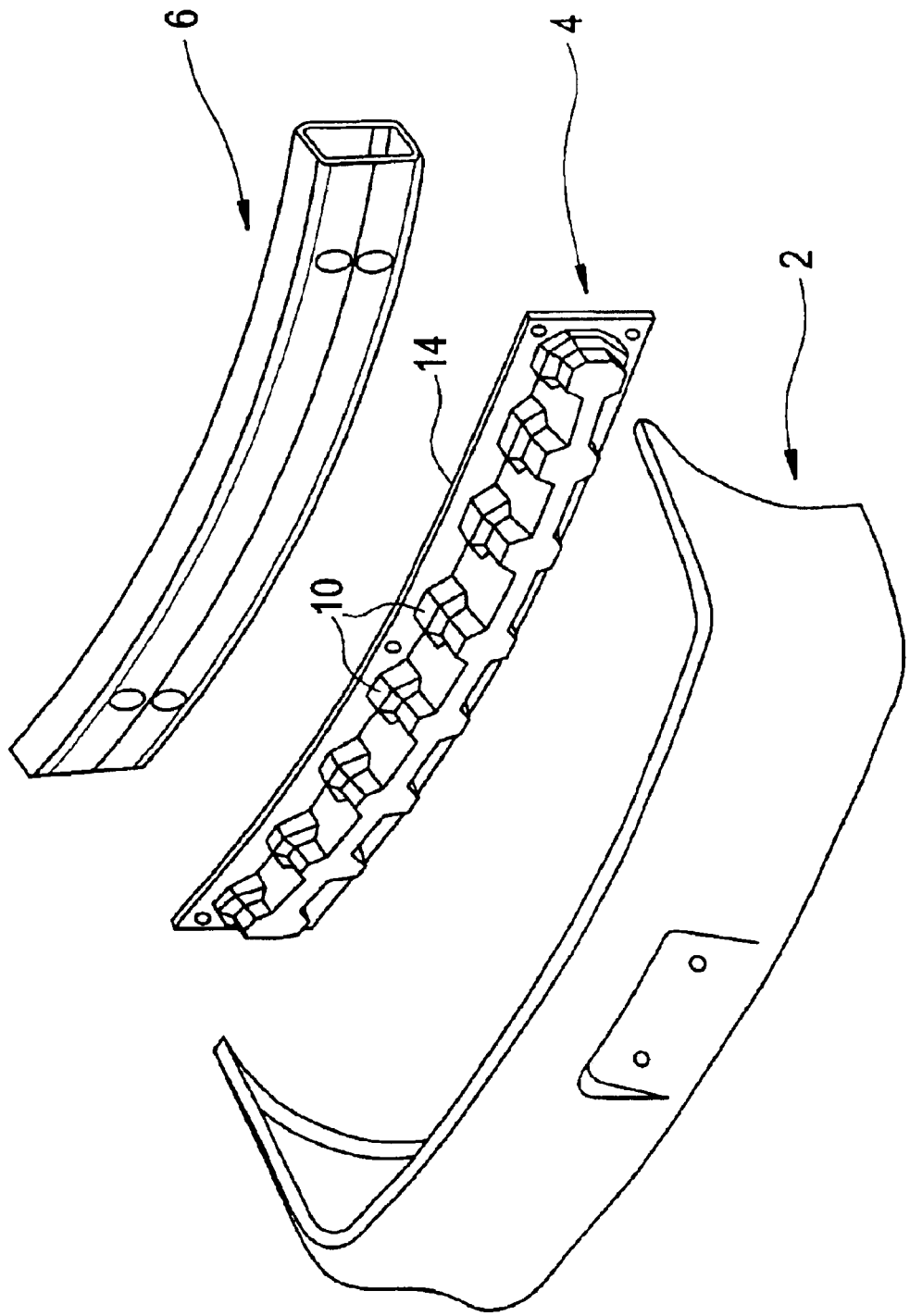
FIG. 1 is an exploded view of the energy absorbing system.

FIG. 1 shows a view of an energy absorber 4, which when combined with a reinforcing bumper beam 6 and a fascia 2, form an energy absorbing bumper system for an automotive vehicle. The bumper system may be designed for pedestrian protection during impact with the front bumper of a vehicle or for a low speed, low energy vehicle to solid structure impact. The energy absorber 4 incorporates a plurality of crushable lobes 10 with each of the lobes 10 having a geometry, which provides a desired functionality, which may be adapted for enhancing crushability. The crushable lobes or lobes 10 primarily provide for lower and/or upper pedestrian leg protection during impact. The crush lobe 10 deforms during impact and absorbs energy. The energy absorption efficiency of the crush lobes 10 are adaptable for reducing the forces translated into a pedestrian's leg during impact and the forces translated to the vehicle structure vehicle during low speed impact therewith. The impact response of the energy absorber may be tuned for a specific vehicle through both the use of different density material, thickness of material, and/or part geometry of the energy absorber as described hereinafter. According to various embodiments, the energy absorber incorporates one or more of the following features: crush initiators, crush lobe, lobe spacing, density, crush cone draft and/or absorber height, width, and length. One or more features may be varied in order to tune the energy absorber impact response for specific impact energy levels. For example, the crush lobes 10 may be varied in height, width, draft, and/or length depending upon whether or not to design the geometry for a lower or higher force to cause deformation of the energy absorber. The geometry may also depend upon space limitation or customer styling or higher or lower package space available, which geometry could include crush cone draft, crush cone initiator draft, crush cone height, width, and/or length.

According to an embodiment, the energy absorber 4 is compression molded from a low density glass mat thermoplastic composite (GMT). One such mat is prepared by AZDEL, Inc. and sold under the trademark SUPERLITE® mat. The density as employed and defined herein is the weight of a square meter of the GMT. Preferably, the density of the GMT is from about 600 grams per square meter (gms/m$^2$) to about 3000 grams/m$^2$. The density may be less than 600 grams/m$^2$ or greater than 3000 grams/m$^2$ depending on the desired energy absorber impact wanted. Preferably, the upper density should be less than 3000 grams/m$^2$. The upper limit of the density should not so stiff as not to absorb the energy of impact on a pedestrian such as not to reduce the forces translated to a pedestrian's leg or leg's upon impact.

The SUPERLITE® mat is prepared using chopped glass fibers, a thermoplastic resin binder and a thermoplastic polymer film or films such a polypropylene (PP), polybutylene terephethalate (PBT), polyethylene terephthalate (PET), polycarbonate (PC), a blend of PC/PBT, or a blend of PC/PET. Generally, PP, PBT, PET, PC/PET or PC/PBT blend are the preferred thermoplastic resins. To produce the low density GMT, the materials including other additive are metered, (maybe continuously), into a dispersing foam contained in an open top mixing tank filtered with an impeller. The foam aides in dispersing the glass fibers and thermoplastic resin binder. The dispersed mixture of glass and thermoplastics binder is pumped to a head-box via a distribution manifold. The head box is located above a wire section of a paper machine. The foam, not the glass fiber or thermoplastic binder, is removed as the dispersed mixture passes through a moving wire screen using a vacuum, continuously producing a uniform, fibrous wet web. The wet web is passed through a dryer to reduce moisture content and to melt the thermoplastic resin binder. When the wet web comes out of the dryer, a special multi-layer thermoplastic film is laminated into the web by passing the web of glass fiber, thermoplastic binder and thermoplastic polymer film or films through the nip of a set of heated rollers. A PET scrim layer may also be attached to one side or to both sides of the web to facilitate ease of handling the glass fiber reinforced mat. The mat may also have an adhesive layer or film on one side to aide in attachment to a reinforcing beam or whatever. The SUPERLITE® composite is then passed through tension rolls and continuously cut (guillotined) into the desired size.

The resulting mat is desirably a low density composite. While the measurement of density is not a true density value, it is a measurement (as described above) for determining the suitability of the composite for an energy absorber. The "density", as stated previously, is preferably from about 600 grams/m$^2$ to about 3000 grams/m$^2$. Generally, glass mat thermoplastic composites made by a conventional process are high density composites of around 5000 grains/m$^2$ or higher. The high density composites are not suitable as an energy absorber for minimizing or reducing pedestrian injury since such composites are much too stiff.

Other natural or synthetic fibers such as polyethylene terephthate fibers, polyamide fibers, carbon fibers, etc. may be used for the production of a low density mat. Also, various amorphous or crystalline thermoplastic resins may be employed such a polyesters (PET, PBT, PPT), acrylics, HDPE, polyethylene (PET), polypropylene (PP), polycarbonate (PC) or blends of PC/PBT or PC/PET and the like thermoplastics polymers without modification of the web forming process. The ratio of fibers to polymers, as well as the basic weight of the web, can be easily varied in order to meet individual requirements of cost/performance and energy absorption.

The glass mat, preferable a low density glass mat (GMT) composite, is desirably formed into the energy absorber 4 by a forming technique such as compression molding or thermoforming which may use air or gas pressure as an assist. A vacuum is often used in thermoforming but it is also contemplated that a positive pressure may be utilized in the forming operation. In compression molding, the reinforced resin material is heated to a softening temperature, typically, from about 500 to about 700° F. The resin in heated form is placed adjacent the bottom surface of the compression mold. The mold is closed to compress the mat to the point where resin flows from the compressed mat or the deposited reinforcing resin. Desirable the reinforced resin material heated to the softening point. Molds are typically made from a metal having high thermal conductivity such as aluminum.

The mold may be provided with both heating and cooling systems. Oil typically is used as a coolant. The mold may be equipped with ejectors for ejecting the formed mat from the mold cavity. Typically, thermoforming comprises the simultaneously heating and forming an, e.g., a sheet, into the desired shape. Once the desired shape has been obtained, the formed article is cooled below its thermoplastic temperature and removed from the mold. Thermoforming methods and tools are described in detail in DuBois and Pribble's "Plastics Mold Engineering Handbook", Fifth Edition, 1995, pages 468 to 498. Thermoforming methods may also be utilized as set forth in U.S. Pat. No. 5,601,679 to Mulcahy et al. Vacuum assist is typically utilized in thermoforming. The sheet may be placed on a vacuum box or mold form having openings connected to a source of a vacuum. During heating, the sheet begins to sag. Typically, the box may have a plurality of openings in a mold form for drawing the sheet into mold during the forming operation. Typically, the sheet in placed over a concave mold and heated such as by an infrared heater. Vacuum is applied to draw the laminate into place against the mold cavity. The process may be modified combining a positive air pressure on the top of the laminate with vacuum from the underside to increase the molding force.

Referring to FIG. 1, there is illustrated an exploded view of component parts of a vehicle front bumper system including fascia 2, energy absorber 4 and reinforcing bumper beam 6. When assembled, energy absorber 4 is positioned between fascia 2 and reinforcing bumper beam 6. Fascia 2 envelopes energy absorber 4 and reinforcing bumper beam 6 in the assembled form (not shown). Means are desirable provided to fixedly attach the energy absorber 4 to the bumper beam 6 such as bolts and nuts. Fascia 2 is maybe formed from a thermoplastic material which, preferably, has a finished surface and may be amenable to finishing utilizing conventional vehicle painting and/or coating techniques. As stated, generally, the fascia will envelop both the energy absorber 4 and reinforcing bumper beam 6 such that neither of the components, other than fascia 2, is visible once they are attached to the vehicle. The fascia 2 may be attached to the bumper beam 6 or other part of the vehicle.

Figure 2:
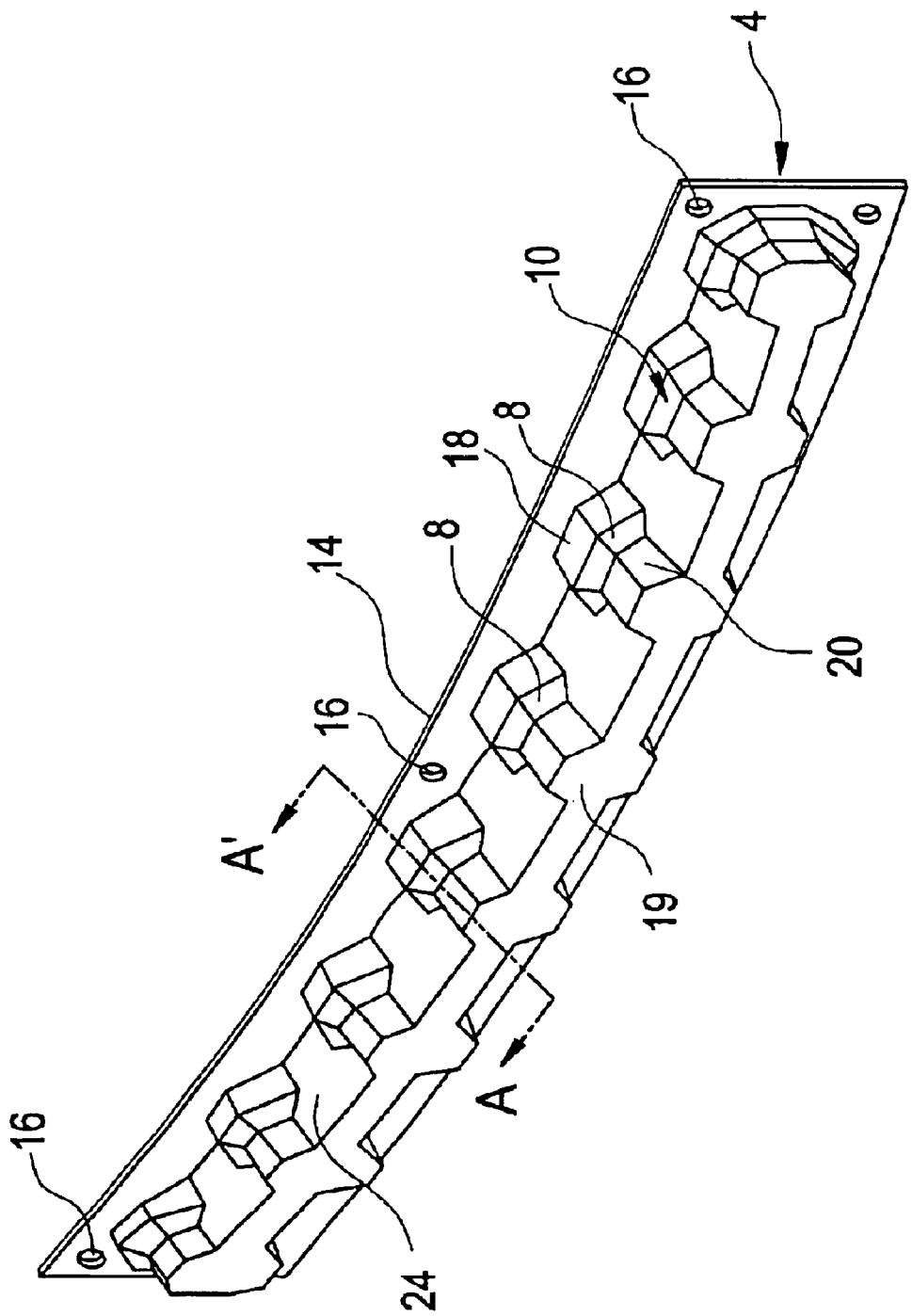
FIG. 2 is a front perspective view of the energy absorber.
Figure 3:
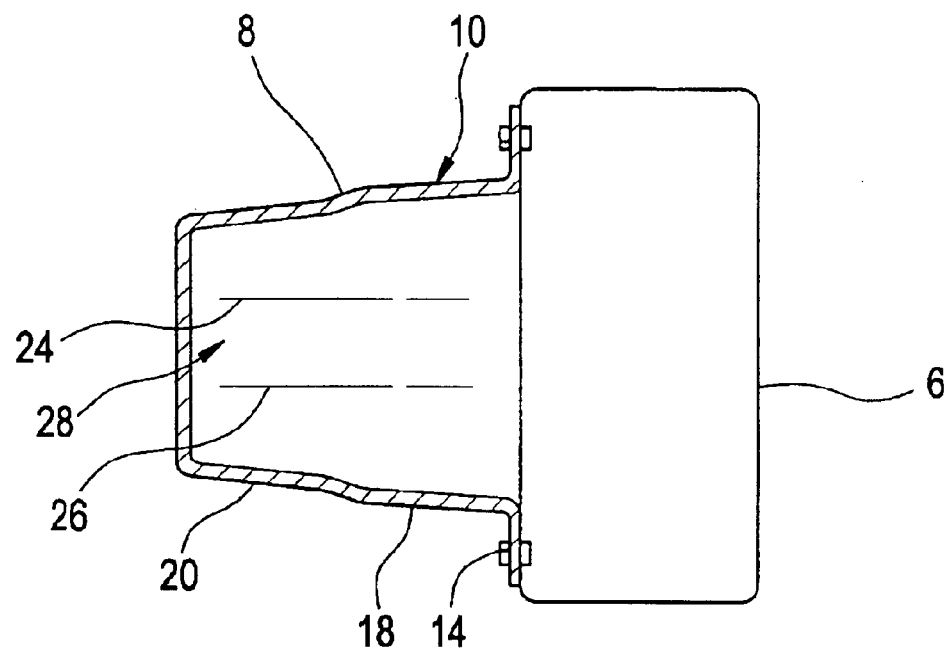
FIG. 3 is a cross sectional view of the energy absorber of along section A–A$^1$ of FIG. 2.
Figure 4:
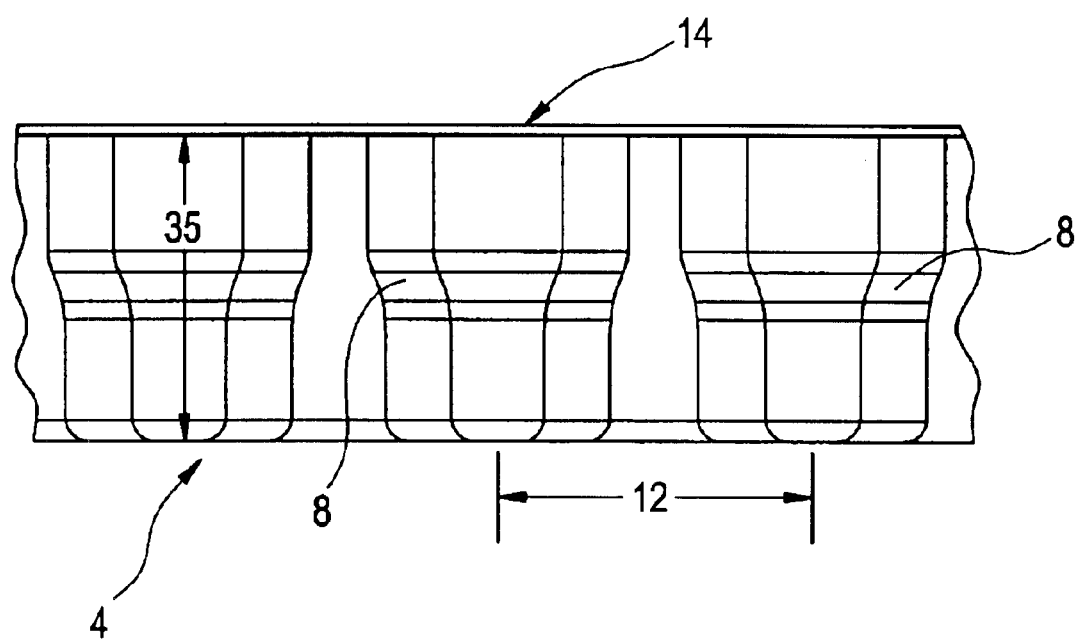
FIG. 4 is a partial top view of the energy absorber of FIG. 2.

As shown in FIG. 2, the energy absorber 4 has a rearward facing flange or support 14 for mounting to the bumper beam 6. Holes 16 are provided in the flange 14 for inserting fastening means such as bolts (not shown) to fixedly mount the energy absorber 4 to the bumper beam 6. A plurality of crushable lobes 10 project outwardly from the flange 14 and are spaced longitudinally along the energy absorber 4. FIG. 4 shows the spacing between the respective crush lobes 10 as reference number 12. As illustrated in FIG. 4, the crush lobes 8 are spaced apart an equal distance 12. The distance 12 is less than the width of an individual lobe 8 so that a space is formed between adjacent lobes 10. FIG. 4 illustrates an energy absorber 4 embodiment having substantially equal spacing 12 between respective crush lobes 10. It is contemplated that other spacing may be utilized. A closer spacing and increasing the number of lobes 10 may be a variable that is used to increase impact resistance. As shown in FIG. 3 and FIG. 5, each crush lobe 10 includes a rear lobe portion 18 and a front lobe portion 20 with the crush initiator portion 8 intermediate the rear and front lobe portions, 18 and 20 respectively. The crush initiator portion 8 preferably has a tapered or conically shape and connects the rear 18 and front 20 lobe portions. One or the other of the rear 18 or front 20 lobe portions has a larger cross-sectional area. As illustrated in FIG. 2, the front lobe portion 20 has a smaller cross-sectional area than the rear lobe portion 18 so that the front lobe portion 20 tends to crush into the rear lobe portion 18. The front lobe portion 18 terminates at a lobe front wall 19, which is substantially parallel to and spaced from the face of the flange 14. The lobe front wall extends longitudinally along the length of the energy absorber 4. The front surface of the energy absorber 4 is adapted to contact the fascia and deforms as the fascia moves against the energy absorber 4 and to dissipate forces generated by impact of the bumper system with an object.

FIG. 3 is a view along cross section A–A$^1$ of FIG. 2 and shows energy absorber 2 attached to reinforcing bumper beam 6 through holes (not shown) in flange 14 of energy absorber 2 and crush initiator 8. Flange 14 illustrated in FIG. 2 and FIG. 3 is an integral part of energy absorber 2. As shown in FIG. 3, the cross section illustrates an embodiment where an upper portion of one of the lobes 10 is separated from a bottom portion of the lobe by respective upper and lower walls, 24, 26, which extend in a transverse direction along the longitudinal axis of the energy absorber. Respective upper and lower walls, 24, 26, connect adjacent lobes 10. As shown in FIG. 3, upper and lower walls form a channel 28, which extends through the lobes 10. Joining of the crushable lobes 10 integrates the crushable lobes so that the respective lobes co acts upon impact and deformation. Forces causing deformation of one lobe 10 are transmitted to an adjacent lobe 10 through the upper and lower walls 24, 26.

FIG. 4 is a perspective view of energy absorber 2 with a top view B of energy absorber 2 as shown in FIG. 5 which shows flange 14, crush initiator 8, and crush lobe cones 10 with crush initiator 8 and spacing 12 between crush lobe cones 10.

While the crush lobe cones have a cone configuration, they preferably have a draft 35 or forwardly projecting distance from the flange toward the impact front of the energy absorber as shown in the drawings. The draft further aides in quick translation of the impact force first to the crush initiator 8 of each of the crush lobes 10 thereby aiding in minimizing the force of impact on a pedestrian. In order words, the crush initiators 8 and crush lobes 10 provide for efficient energy absorption upon impact to reduce the forces translated into a pedestrian leg during impact. The energy absorber can be tuned for a specific vehicle through the use of different density GMT materials and/or through changes in geometry, crush lobe cone draft angles, crush lobe cone spacing and/or energy absorber height, width and length as discussed previously. These can all be varied in order to tune the energy absorber impact response for specific impact energy levels.

While it will be apparent that the preferred embodiments of this invention as disclosed are well calculated to fulfill the objects stated, it will be appreciated that the invention is susceptible to modifications, variations, and changes without departing from the spirit and scope of the present invention being limited only in terms of the appended claims.

What is claimed is:

1. An energy absorber adapted for attachment to a vehicle for absorbing forces generated from an impact, said energy absorber comprising a unitary structure comprising a molded mat of fiber reinforced resin material, said molded mat having a density of about 600 to about 3000 grams per square meter wherein density is determined by the weight of a square meter of said molded mat, said structure having a plurality of forwardly projecting crushable lobes adapted to crush upon impact, each said lobe comprising a front portion, a rear portion, and a crush initiator portion between said front and rear portions, said initiator portion comprising a substantially conically shaped portion, said plurality of crushable lobes spaced apart longitudinally across said energy absorber.

2. An energy absorber adapted for attachment to a vehicle for absorbing forces generated from an impact according to claim 1 wherein said energy absorber has an elongated shape and is adapted for mounting to the forward end of a vehicle for extending longitudinally across the width of the vehicle.

3. An energy absorber adapted for attachment to a vehicle for absorbing forces generated from an impact according to claim 2 wherein said energy absorber is adapted for pedestrian leg protection and has a highly efficient crush mode.

4. An energy absorber adapted for attachment to a vehicle for absorbing forces generated from an impact according to claim 2 is adapted to reduce forces of impact with legs of a pedestrian.

5. An energy absorber adapted for attachment to a vehicle for absorbing forces generated from an impact according to claim 2 wherein the energy absorber is adapted to absorb energy during an impact of said vehicle at low speeds of less than or equal to 5 Mph.

6. An energy absorber adapted for attachment to a vehicle for absorbing forces generated from an impact according to claim 2 said energy absorber consist essentially of a single integral unit of thermoformed or compression molded material.

7. An energy absorber adapted for attachment to a vehicle for absorbing forces generated from an impact according to claim 6 wherein said forwardly projecting portion comprises a plurality of forwardly projecting crushable lobes, each lobe having a forwardly facing wall.

8. An energy absorber adapted for attachment to a vehicle for absorbing forces generated from an impact according to claim 7 wherein said energy absorber includes a support portion for said crushable lobes, said support portion being adapted for attachment to bumper beam.

9. An energy absorber adapted for attachment to a vehicle for absorbing forces generated from an impact according to claim 8 wherein said plurality of crushable lobes extend outwardly from the support portion, each of said lobes having a forwardly facing front wall, at least a pair of adjacent lobes having interconnecting front walls.

10. An energy absorber adapted for attachment to a vehicle for absorbing forces generated from an impact according to claim 9 wherein each crush initiating portion comprising a portion of said lobe having a different cross sectional area than another portion of said lobe.

11. An energy absorber adapted for attachment to a vehicle for absorbing forces generated from an impact according to claim 10 wherein said plurality of the crush means are attached longitudinally across the front of the support portion.

12. An energy absorber adapted for attachment to a vehicle for absorbing forces generated from an impact according to claim 10 wherein said plurality of crushable lobes project forwardly and are spaced apart longitudinally across said support portion.

13. An energy absorber adapted for attachment to a vehicle for absorbing forces generated from an impact according to claim 2 wherein and said energy absorber is compression molded or thermoformed.

14. An energy absorber adapted for attachment to a vehicle for absorbing forces generated from an impact according to claim 13 wherein the energy absorber is compression molded.

15. An energy absorber adapted for attachment to a vehicle for absorbing forces generated from an impact according to claim 14 wherein said energy absorber comprises fiber reinforcement in a matrix of thermoplastic material.

16. An energy absorber adapted for attachment to a vehicle for absorbing forces generated from an impact according to claim 15 wherein said mat is formed by heating a thermoplastic polymer to bind fibers in said mat.

17. An energy absorber adapted for attachment to a vehicle for absorbing forces generated from an impact according to claim 16 wherein said mat comprises a chopped glass fibers and a thermoplastic binder material.

18. An energy absorber adapted for attachment to a vehicle for absorbing forces generated from an impact according to claim 17 wherein said thermoplastic polymer of the glass mat comprises polyester resin, a polycarbonate, or mixture thereof.

19. An energy absorber adapted for attachment to a vehicle for absorbing forces generated from an impact according to claim 18 wherein said polyester is a polyalkylene terephthalate.

20. An energy absorber adapted for attachment to a vehicle for absorbing forces generated from an impact according to claim 19 wherein said polyester is polybutylene terephthalate and said polycarbonate is an aromatic polycarbonate.

21. An energy absorber adapted for attachment to a vehicle for absorbing forces generated from an impact according to claim 17 wherein said thermoplastic of said the glass mat thermoplastic composite is a polyolefin.

22. An energy absorber adapted for attachment to a vehicle for absorbing forces generated from an impact according to claim 17 wherein said energy absorber is interdisposed between the fascia and reinforcing bumper beam, said vehicle bumper being attachable to the front of an automotive vehicle, said fascia enveloping the energy absorber and reinforcing beam such that neither component other than the fascia is visible once attached to the vehicle.

* * * * *